United States Patent
Alabbad et al.

(10) Patent No.: US 11,163,091 B2
(45) Date of Patent: Nov. 2, 2021

(54) IN-SITU HYDROCARBON DETECTION AND MONITORING

(71) Applicant: Saudi Arabian Oil Company, Dhahran (SA)

(72) Inventors: Abrar Alabbad, Al-Jish (SA); Wisam AlKawai, Qatif (SA); Mahdi Abuali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/750,181

(22) Filed: Jan. 23, 2020

(65) Prior Publication Data

US 2021/0231832 A1   Jul. 29, 2021

(51) Int. Cl.
*G01V 9/00* (2006.01)
*E21B 49/08* (2006.01)
*E21B 43/24* (2006.01)

(52) U.S. Cl.
CPC .......... *G01V 9/007* (2013.01); *E21B 43/2401* (2013.01); *E21B 49/087* (2013.01); *E21B 49/0875* (2020.05)

(58) Field of Classification Search
CPC .... E21B 49/087; E21B 49/0875; E21B 49/10; E21B 49/113; E21B 49/114; G01N 33/0047; G01N 33/0009; G01V 9/007
See application file for complete search history.

(56) References Cited

U.S. PATENT DOCUMENTS

| | | | |
|---|---|---|---|
| 3,302,706 A | * | 2/1967 | Thompson ............ E21B 49/00 166/250.16 |
| 3,493,060 A | | 2/1970 | Van Dyk |
| 3,693,718 A | | 9/1972 | Stout |
| 3,785,437 A | | 1/1974 | Clampitt et al. |
| 4,019,331 A | | 4/1977 | Rom et al. |
| 4,061,190 A | | 12/1977 | Bloomfield |
| 4,319,482 A | | 3/1982 | Bunner |
| 4,480,695 A | | 11/1984 | Anderson |
| 4,663,614 A | | 5/1987 | Rauchwerger |
| 4,765,182 A | * | 8/1988 | Boone ................. E21B 49/005 175/50 |

(Continued)

FOREIGN PATENT DOCUMENTS

| | | | | |
|---|---|---|---|---|
| CN | 111033227 A | * | 4/2020 | ............ G01V 1/44 |
| CN | 111335890 A | * | 6/2020 | |

(Continued)

OTHER PUBLICATIONS

International Search Report for PCT/IB2020/051490, 7 pages (dated Nov. 10, 2020).

(Continued)

*Primary Examiner* — Jennifer H Gay
(74) *Attorney, Agent, or Firm* — Charles E. Lyon; Mehdi Hajizadegan; Peter A. Flynn

(57) ABSTRACT

System and methods for heating boreholes include laser generators to trigger a chemical reaction to break down heavy hydrocarbons in boreholes. The systems and methods use arrays of laser generators or other heating sources at the borehole surface or within the borehole to heat the heavy hydrocarbons. The systems and methods may include hydrocarbon sensors within the borehole to detect gas seepage resulting from heating of the heavy hydrocarbons.

21 Claims, 7 Drawing Sheets

(56) References Cited

U.S. PATENT DOCUMENTS

| | | | |
|---|---|---|---|
| 4,802,143 A | 1/1989 | Smith | |
| 5,855,243 A | 1/1999 | Bragg | |
| 5,887,008 A | 3/1999 | Ikegami | |
| 6,867,589 B2 | 3/2005 | Heaton | |
| 6,995,846 B2 | 2/2006 | Kalayeh et al. | |
| 7,121,342 B2* | 10/2006 | Vinegar | E21B 36/04 |
| | | | 166/302 |
| 7,325,604 B2 | 2/2008 | Wittie et al. | |
| 7,360,588 B2* | 4/2008 | Vinegar | E21B 43/2401 |
| | | | 166/59 |
| 7,640,980 B2* | 1/2010 | Vinegar | E21B 43/24 |
| | | | 166/268 |
| 7,747,388 B2 | 6/2010 | Mombourquette et al. | |
| 7,809,538 B2 | 10/2010 | Thomas | |
| 7,821,635 B2* | 10/2010 | Pope | G01V 8/02 |
| | | | 356/326 |
| 7,938,175 B2* | 5/2011 | Skinner | E21B 49/00 |
| | | | 166/57 |
| 7,942,203 B2* | 5/2011 | Vinegar | E21B 36/04 |
| | | | 166/252.1 |
| 8,235,110 B2 | 8/2012 | Larter et al. | |
| 8,445,841 B2 | 5/2013 | Szobota et al. | |
| 8,579,031 B2* | 11/2013 | Vinegar | E21B 43/2401 |
| | | | 166/302 |
| 8,863,839 B2 | 10/2014 | Kaminsky et al. | |
| 9,158,033 B2 | 10/2015 | Bradley et al. | |
| 9,488,750 B2 | 11/2016 | Bright | |
| 9,528,322 B2 | 12/2016 | MacDonald | |
| 9,593,983 B2* | 3/2017 | Badri | E21B 49/00 |
| 10,094,215 B2 | 10/2018 | Bright | |
| 10,113,952 B2 | 10/2018 | Washburn | |
| 10,234,437 B2 | 3/2019 | Bright | |
| 10,280,747 B2 | 5/2019 | AbuAli et al. | |
| 10,598,012 B2* | 3/2020 | Badri | E21B 49/00 |
| 10,968,736 B2* | 4/2021 | Batarseh | E21B 7/14 |
| 2005/0051327 A1* | 3/2005 | Vinegar | E21B 43/2401 |
| | | | 166/256 |
| 2005/0256647 A1* | 11/2005 | Ellis | G01N 33/241 |
| | | | 702/9 |
| 2006/0102343 A1* | 5/2006 | Skinner | G01N 21/718 |
| | | | 166/250.1 |
| 2006/0202122 A1 | 9/2006 | Gunn et al. | |
| 2006/0249288 A1* | 11/2006 | Drozd | E21B 47/11 |
| | | | 166/254.1 |
| 2007/0068242 A1* | 3/2007 | DiFoggio | G01J 3/443 |
| | | | 73/152.55 |
| 2007/0131411 A1* | 6/2007 | Vinegar | E21B 36/02 |
| | | | 166/59 |
| 2007/0170722 A1 | 7/2007 | Reynolds et al. | |
| 2008/0290719 A1 | 11/2008 | Kaminsky et al. | |
| 2009/0071647 A1* | 3/2009 | Vinegar | E21B 47/00 |
| | | | 166/266 |
| 2010/0181066 A1* | 7/2010 | Vinegar | E21B 47/06 |
| | | | 166/252.1 |
| 2011/0259591 A1* | 10/2011 | Vinegar | E21B 47/06 |
| | | | 166/302 |
| 2011/0278270 A1 | 11/2011 | Braga et al. | |
| 2014/0182843 A1* | 7/2014 | Vinegar | E21B 43/24 |
| | | | 166/250.01 |
| 2014/0190949 A1 | 7/2014 | Zediker et al. | |
| 2016/0069177 A1* | 3/2016 | Badri | E21B 49/00 |
| | | | 250/269.1 |
| 2016/0312609 A1* | 10/2016 | Ritzmann | E21B 49/08 |
| 2016/0341038 A1* | 11/2016 | AbuAli | G01N 1/2294 |
| 2017/0138188 A1* | 5/2017 | Badri | E21B 49/00 |
| 2018/0238153 A1 | 8/2018 | Nevison | |
| 2018/0261972 A1 | 9/2018 | Filgas et al. | |
| 2019/0353032 A1* | 11/2019 | Batarseh | E21B 43/247 |
| 2021/0229219 A1 | 7/2021 | Alabbad et al. | |

FOREIGN PATENT DOCUMENTS

| | | | | |
|---|---|---|---|---|
| CN | 111502650 B | * | 10/2020 | ............ E21B 47/00 |
| WO | WO-94/09088 A1 | | 4/1994 | |
| WO | WO-2004003506 A2 | * | 1/2004 | ......... G01N 21/8507 |
| WO | WO-2004097159 A2 | * | 11/2004 | ............ E21B 47/06 |
| WO | WO-2009142803 A1 | * | 11/2009 | ............ E21B 43/24 |
| WO | WO-2016/004323 A2 | | 1/2016 | |
| WO | WO-2021/148848 A1 | | 7/2021 | |

OTHER PUBLICATIONS

Invitation to Pay Additional Fees for PCT/IB2020/051490, 12 pages (dated Sep. 17, 2020).

Written Opinion for PCT/IB2020/051490, 13 pages (dated Nov. 10, 2020).

Shields, J., et al.. Microscopy & Microanalysis Part 1, Biological Sciences Symposia, August 3-7, 2014.

* cited by examiner

IN-SITU HYDROCARBON DETECTION AND MONITORING

FIELD

The subject matter described herein relates to systems and methods for improving the production of oil wells.

BACKGROUND

Modern drilling systems often encounter heavy hydrocarbons in the subsurface. Due to the high viscosity, heavy hydrocarbons are typically either left behind in the reservoir (which reduces the volume of potential recovered hydrocarbons), or they accumulate to create what are known as "tar pads," (or "tar mats") that can clog the pores of a formation and trap the hydrocarbons within the well or borehole. This can create issues for reservoir management and drilling.

Current heating technologies such as steam injection are used to heat up the hydrocarbons (thereby lowering the viscosity) by injecting the steam from another well or by using cyclic steam stimulation. One drawback to this technology is that when steam cools in the formation, it becomes water which adds to the volumes of mixed fluid in the well, increases the required extraction energy, and necessitates downstream water/oil separation processes. In addition, the volume of water required for steam injection during production is enormous due to having to maintain the pore pressure high enough to enhance heavy hydrocarbon recovery.

SUMMARY OF THE INVENTION

The present disclosed embodiments include systems and methods that use laser generators to trigger a chemical reaction to break down heavy hydrocarbons in wells or boreholes. The systems and methods use arrays of laser generators and other heat sources at the borehole surface or within the borehole to heat the heavy hydrocarbons. The systems and methods may include hydrocarbon sensors within the borehole to detect gas seepage resulting from heating of the heavy hydrocarbons.

In one aspect, the present invention includes a system for monitoring gas seepage in a borehole including: at least one hydrocarbon sensor disposed within the borehole; and at least one laser generator disposed proximate the borehole for heating at least one target location within the borehole, where gas seepage from the heating of the target location is detected by the hydrocarbon sensor.

In some embodiments, the laser generator is disposed at a location that includes the borehole surface and/or an interior of the borehole.

In some embodiments, the hydrocarbon sensor includes multiple hydrocarbon sensors vertically arranged at multiple depths within the borehole.

In some embodiments, the system includes multiple hydrocarbon sensors, where at least one hydrocarbon sensor is oriented at a different angle than at least one other hydrocarbon sensor.

In some embodiments, the system includes at least one hydrocarbon sensor disposed at a depth within the borehole corresponding to a hydrocarbon layer of a formation in which the borehole is disposed.

In some embodiments, the system includes at least one hydrocarbon sensor disposed at a depth within the borehole corresponding to a gas layer of a formation in which the borehole is disposed.

In some embodiments, the system includes at least one hydrocarbon sensor disposed at a depth within the borehole corresponding to a cap rock layer of a formation in which the borehole is disposed.

In some embodiments, the system includes at least one mounting arm aligned vertically and disposed within the borehole; at least one laser generator mounted to the mounting arm; and at least one infrared pyrometer mounted to the mounting arm. The multiple hydrocarbon sensors are mounted to the mounting arm.

In some embodiments, the system includes: at least one mounting arm aligned vertically and disposed within the borehole, a centerline of the mounting arm disposed at a first distance from a borehole wall. The first distance is about twenty (20) percent or less of a borehole diameter, and the hydrocarbon sensor is mounted to the mounting arm.

In some embodiments, a centerline of the mounting arm is disposed at a first distance from a borehole wall, and the first distance is about ten (10) percent or less of a borehole diameter.

In some embodiments, a centerline of the mounting arm is disposed at a first distance from a borehole wall, and the first distance is about five (5) percent or less of a borehole diameter.

In some embodiments, the hydrocarbon sensor determines that a source of the gas seepage in the borehole includes heavy hydrocarbons based on an ethane composition index value of about 57 or less.

In some embodiments, the hydrocarbon sensor determines that a source of the gas seepage in the borehole includes light hydrocarbons based on an ethane composition index value from about 57 to about 67.

In some embodiments, the hydrocarbon sensor determines that a source of the gas seepage in the borehole includes hydrocarbon condensate based on an ethane composition index value from about 67 to about 71.

In some embodiments, the hydrocarbon sensor determines that a source of the gas seepage in the borehole includes gas based on an ethane composition index value of about 71 or higher.

In another aspect, the present invention includes a method of monitoring gas seepage within a borehole including: disposing at least one hydrocarbon sensor within a borehole proximate at least one target location; heating the target location; and detecting, at the hydrocarbon sensor, gas seepage within the borehole. The hydrocarbon sensor detects a gas seepage composition and/or a volume flow of the gas seepage.

In some embodiments, the method includes determining an ethane composition index value based on at least one reading from the hydrocarbon sensor; and determining a source of the gas seepage within the borehole based on the ethane composition index value.

In some embodiments, heating the target location includes heating the target location with at least one laser generator, and at least one operational parameter of the laser generator is adjusted based on at least one reading from the hydrocarbon sensor.

In another aspect, the present invention includes a system for monitoring gas seepage in a borehole including: at least one hydrocarbon sensor disposed within a borehole for detecting the gas seepage within the borehole. An ethane composition index value is determined based on at least one reading from the hydrocarbon sensor, and a source of the gas seepage is determined based on the ethane composition index value.

In some embodiments, the system includes at least one heating source, where the heating source heats at least one portion of a formation in which the borehole is disposed, thereby resulting in the gas seepage within the borehole.

In some embodiments, the system includes a wireline, a slickline, and/or a coiled tubing coupled to the hydrocarbon sensor.

Throughout the description, where an apparatus, systems or compositions are described as having, including, or comprising specific components, or where methods are described as having, including, or comprising specific steps, it is contemplated that, additionally, there are systems, apparatuses or compositions of the present invention that consist essentially of, or consist of, the recited components, and that there are methods according to the present invention that consist essentially of, or consist of, the recited processing steps.

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which.

DESCRIPTION OF CERTAIN ASPECTS OF THE INVENTION

Figure 1:
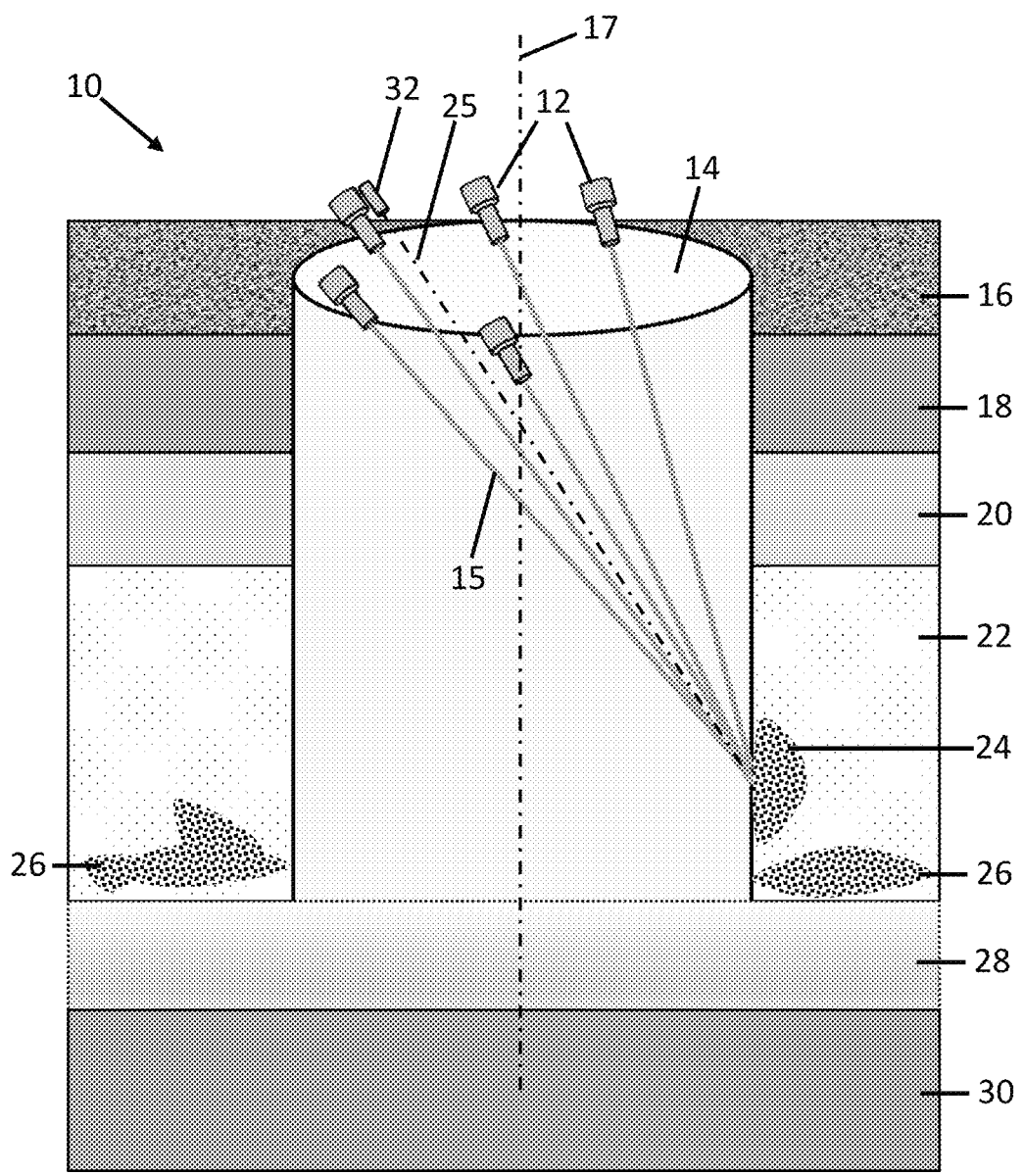
FIG. 1 illustrates a side view of a borehole heating system, according to the present embodiments.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

As hydrocarbons are heated, they becomes less viscous and thus easier to mobilize out of a borehole. The present disclosed embodiments include systems and methods that may trigger a chemical reaction to break down large hydrocarbon molecules into smaller ones. A formation surface or substrate within a borehole may be heated via an array of lasers. Heat may then dissipate into the formation (and into the heavy hydrocarbons within the formation) via conduction. Heating decreases the viscosity of the heavy hydrocarbons making them easier to mobilize. The array of lasers may be positioned at the surface or within the borehole to allow in-situ pyrolysis (that is, heating the heavy hydrocarbons to the point where large molecules break down into smaller ones, but not to a point of ignition of the heated hydrocarbons). Stated otherwise, heat from the array of lasers causes thermal decomposition (such as viscosity break-down, carbonization, pyrolysis, as well as other processes that change at least one chemical property) of the heavy hydrocarbons. The present embodiments may also include hydrocarbon sensors, which can be positioned downhole in the proximity of the heating location, in order to gauge the effectiveness of the heavy hydrocarbon heating process, and in order to increase hydrocarbon recover.

Laser Heating for Heavy Hydrocarbon Mobilization

FIG. 1 illustrates an embodiment of a borehole heating system 10, according to aspects of the present disclosure. The system 10 includes one or more laser generators 12 arranged in an array around the surface of a borehole 14. The borehole 14 may be disposed in a formation including soil, sand, or rock 16 disposed at the surface, seal rock 18 (or cap rock or impermeable rock) disposed below the soil (or sand or rock) 16, a layer of gas 20 (such as natural gas) trapped beneath the seal rock 18, hydrocarbons 22 (such as oil) dispose beneath the gas 20, water 28 disposed beneath the hydrocarbons 22, and reservoir rock 30 (or source rock) disposed beneath the water 28. The hydrocarbon layer 22 may include portions of heavy hydrocarbons 26 distributed among lighter hydrocarbons. Each of the one or more laser generators 12 may generate a laser 15 that is focused on a downhole location such as a target location 24, where heavy hydrocarbons 26 may be heated. The borehole heating system 10 may also include one or more infrared pyrometers 32 focused on the target location 24 for measuring a temperature of the formation at or near the target location 24. The one or more infrared pyrometers 32 may be mounted onto the one or more laser generators 12, or may be mounted elsewhere at the surface or within the borehole 14. The one or more infrared pyrometers 32 may emit an infrared beam 25 directed at or near the target location 24, where it reflects back to the one or more infrared pyrometer 32, in which it is interpreted so as to provide a surface temperature measurement of the target location 24. Each of the one or more laser generators 12 may be oriented at a different angle relative to a centerline 17 of the borehole 14. In other embodiments, one or more of the laser generators 12 may be oriented at the same angle relative to a centerline 17 of the borehole 14 as at least one other laser generator 12.

In operation, the array of laser generators 12 constructively interfere with each other to amplify their effect. The lasers target a specific depth in the subsurface where heavy oil is identified. The array of laser generators 12 heats up the reservoir fluid and breaks down the heavy oils to smaller, less viscous components to mix with the produced fluid and unclog the pores in the targeted location 24. The array of laser generators 12 may include laser generators 12 operating at different frequencies and magnitudes in order to enhance the transfer of heat into the formation, without exceeding a combustion temperature of the hydrocarbons. Each laser 12 may include gamma-ray lasers (gasers), as well as ultra-short laser pulses that have the potential to heat up fluid or heavy hydrocarbons without penetrating rocks within the formation. The array of lasers 12 may also include laser generators 12 that emit lower-frequency electromagnetic waves such as infrared (IR), microwave and radio wave lasers (that is, "rasers"). Laser generators 12 may emit lasers 15 in the mid-IR wavelengths that have high absorption rates in hydrocarbon media, and thus may be particularly effective at mobilizing heavy hydrocarbons 26.

Figure 2:
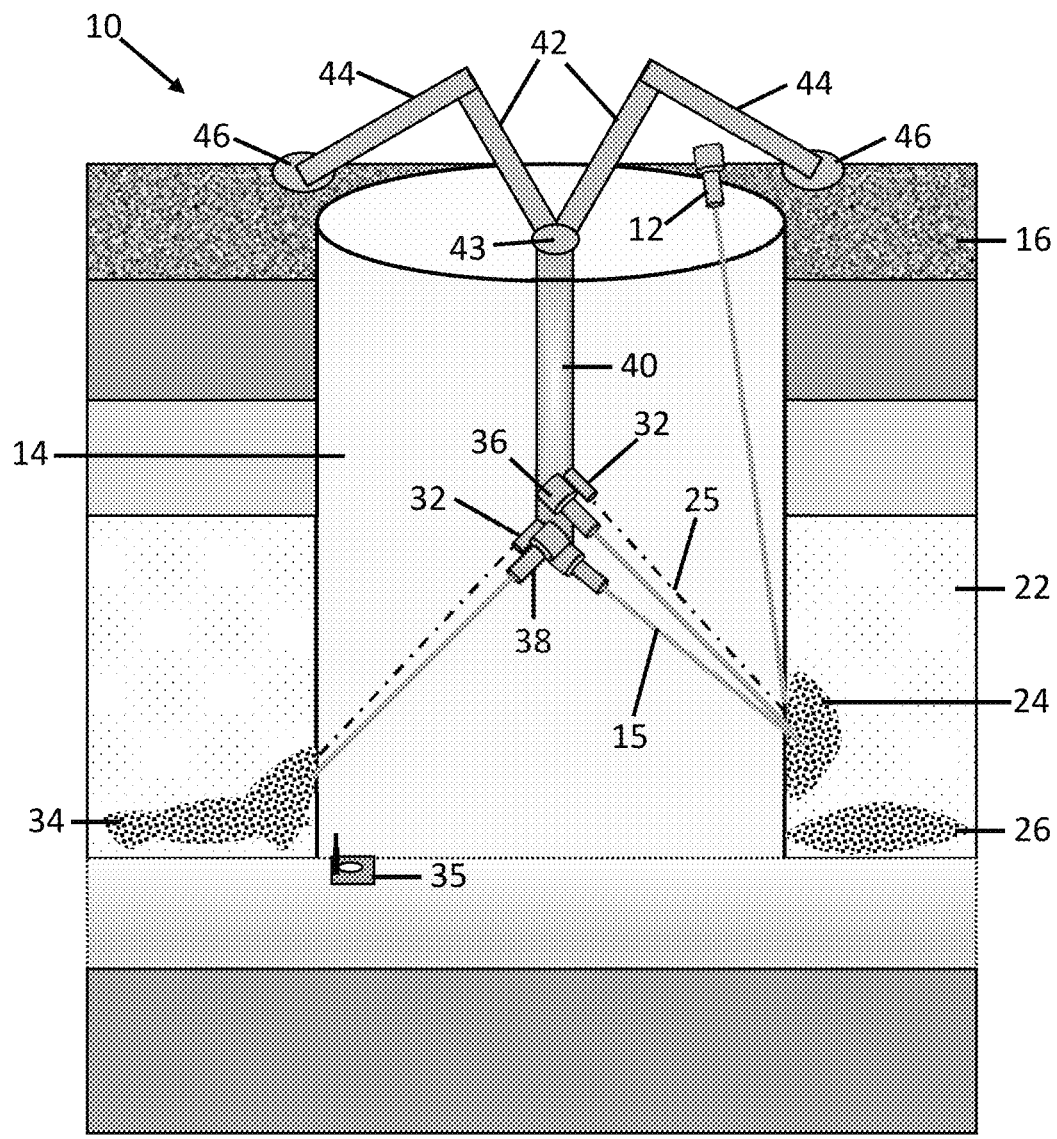
FIG. 2 illustrates a side view of a borehole heating system, according to the present embodiments.

FIG. 2 illustrates an embodiment of the borehole heating system 10, according to aspects of the present disclosure, including the borehole 14, surface soil 16, and the hydrocarbon layer 22, which includes areas of heavy hydrocarbons 26. In the embodiment of FIG. 2, one or more first laser generators 36 may be directed at a first target location 24 while one or more second laser generators 38 may be directed at a second target location 34. The borehole heating system 10 may similarly include a third, fourth, fifth, sixth, seventh and higher numbers of laser generators 36, 38, 12. Each of the first and second laser generators 36, 38 may be mounted to a mounting pole 40 (or other suitable mechanisms) for lowering the one or more first and second laser generators 36, 38 into the borehole 14. The mounting pole 40 may itself be coupled at a hub 43 to one or more first legs 42 which may in turn be coupled to one or more second legs 44 mounted at the borehole surface via one or more surface mounts 46. One or more infrared pyrometers 32 may also be mounted to the mounting pole 40 for enhancing line-of-sight access between the infrared beam 25 and the target locations 24, 34. The mounting pole 40 may move up and down within the borehole 14 allowing the laser generators 36, 38 to be brought in proximity to the first or second target locations 24, 34, thereby enabling enhanced focusing of the laser beam 15 on the target locations 24, 34. Each of the one or more first and second legs 42, 44 may form linkages which can be articulated to create vertical movement of the mounting pole 40 within the borehole 14. Other mechanisms such as pulleys, telescoping poles, pneumatic cylinders, winches, and other suitable mechanisms may be used to lower and raise the mounting pole 40, laser generators 12, and infrared pyrometers 32 within the borehole 14.

Referring still to FIG. 2, the borehole heating system 10 may also include one or more fluid analyzers 35 disposed within the borehole 14 which may be used to identify the approximate depth within the borehole 14 at which the top of the water 28 may be located. In addition, the fluid analyzer 35 may be used to identify potential target locations 24, 34 based on the composition of fluids in different regions of the borehole 14. The one or more fluid analyzers 35 may be used for in-situ fluids by analyzing the gases in the borehole 14 while drilling. Hydrocarbon ratios such as wetness (Wh), balance (Bh), and character (Ch) can be used in the evaluation of hydrocarbon type, and may shed light on the presence of heavy hydrocarbons 26. For example, if the wetness (Wh) is below about 0.5, it implies the fluid is a very "dry" gas such as methane, without much gas condensate or heavy hydrocarbons present. At wetness ratios (Wh) from about 0.5 to about 18, gas may be present (with increasing density correlated with increasing wetness (Wh) values). At wetness ratios (Wh) from about 18 to about 40, oil may be present. At wetness ratios (Wh) of about 40 and beyond, heavy hydrocarbons may be present. If the balance ratio (Bh) is above 100 or if it is higher than the wetness ratio (Wh), productive dry gas may be present. On the other hand, if the balance ratio (Bh) is below the wetness ratio (Wh), gas condensate or wet gas may be present. Finally, the higher the character ratio (Ch) the more likely it is that heavy hydrocarbons are present. For example, at character ratios of 0.5 and above, heavy hydrocarbons may be present or in the vicinity, (thereby indicating that the area in question may be a potential target location 24, 34 for the array of lasers 12).

Still referring to FIG. 2, the one or more fluid analyzers 35 may be used in connection with a remote lab (that is, via collected downhole samples) as well as in a more real-time setting via on-site tools and mobile lab equipment. The one or more fluid analyzers 35 may be communicatively coupled wirelessly to one or more surface transceivers (not shown) and may be physically coupled to drilling equipment or placed in the borehole 14 via other suitable means 14. The one or more fluid analyzers 35 may also include features enabling them to be buoyant (so they float at the top of the downhole water level even as the water level drops or rises with continued drilling), as well as features enabling them to be submersible or waterproof. Each of the one or more first and second legs 42, 44 may be powered via generators, motors, power supplies, and/or via other suitable mechanisms. The borehole heating system 10 may also include one or more laser generators 12 disposed at the surface of the borehole 14, in addition to the one or more laser generators 36, 38 disposed downhole.

Referring still to FIG. 2, the borehole heating systems 10 may also include one or more wirelines (not shown) in place of or in addition to the mounting structure (that is, the mounting arm 40, the mounting hub 43, first and second mounting arms 42, 44, and the surface mounts 46). The one or more wirelines may be used to move components (such as the fluid analyzer 35, the one or more infrared pyrometers 32, the one or more laser generators 36, 38, as well as other components) around within the borehole 14. For example, one or more wirelines may be used to: (1) lower an array of laser generators 36, 38 into the borehole 14, (2) move the array of laser generators 36, 38 around for focusing on different target locations 24 within the borehole 14, and (3) remove the array of laser generators 36, 38 from the borehole 14. The one or more wirelines may similarly be used to communicate with the infrared pyrometers 32, laser generators 36, 38, and the fluid analyzer 35. The one or more wirelines may also be used both to move as well as to communicate with each component disclosed in the present embodiments. In other embodiments, one or more slicklines, coiled tubing, or both may be used to move various components around within the borehole 14.

Figure 3:
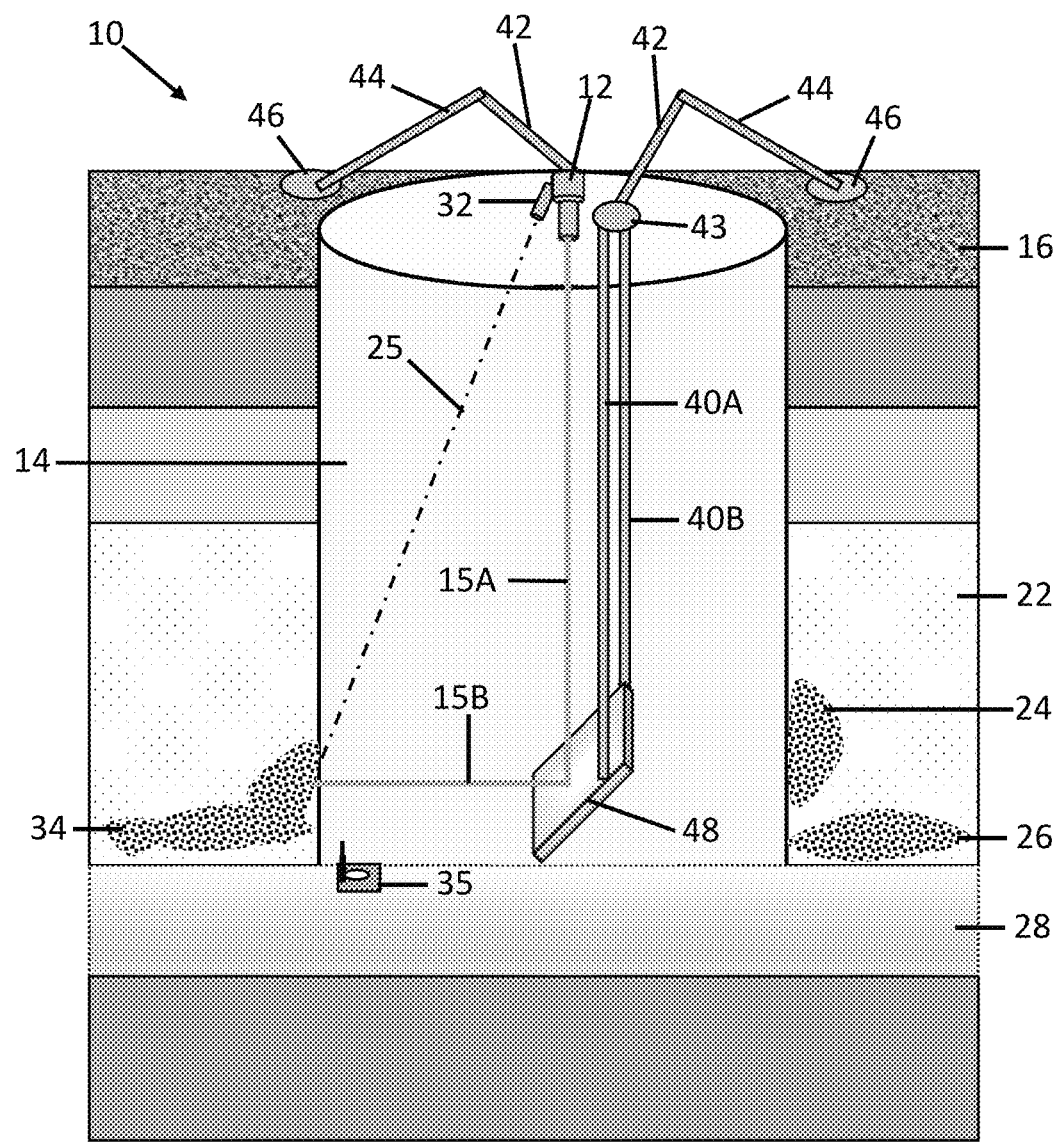
FIG. 3 illustrates a side view of a borehole heating system, according to the present embodiments.

FIG. 3 illustrates an embodiment of the borehole heating system 10, according to aspects of the present disclosure, including the borehole 14, surface soil 16, and the hydrocarbon layer 22, which includes areas of heavy hydrocarbons 26, as well as first and second target locations 24, 34. In the embodiment of FIG. 3, a first mirror 48 may be positioned downhole to reflect the laser from the laser generator 12 to one or more target locations 24, 34, where heavy hydrocarbons 26 are present. The laser generator 12 may produce a first laser beam 15A that is directed to the first mirror 48. A first reflected beam 15B may then reflect off the first mirror and redirect toward the first and/or second target locations 24, 34. The first mirror 48 may be supported within the borehole 14 via a first and second mounting poles 40A, 40B, which may include one or more mechanisms to translate up and down, as well as to move the first and second mounting poles 40A, 40B to various radial and circumferential locations within the borehole 14. The first and/or second mounting pole 40A, 40B may be coupled at the top of the borehole 14 to a hub 43 which allows the first mirror 48 to rotate such that is may be directed to any circumferential location of the formation within the borehole 14. Wirelines, slicklines, coiled tubing, and other mechanisms may also be used to move components around within the borehole 14. The borehole heating system 10 of FIG. 3 may also include one or more infrared pyrometers 32 mounted at the opening of the borehole 14. The infrared beam(s) 25 of the one or more infrared pyrometers 32 may be directed to the first mirror 48 (off of which it may reflect toward the first and/or second target locations 24, 34), or alternatively, the one or more infrared beams 25 may be focused directly on the one or more target locations 24, 34, as illustrated in the embodiment of FIG. 3.

Referring still to FIG. 3, each of the one or more laser generators 12, infrared pyrometers 32, and hub 43 (that is, supporting the first mirror 48) may be supported via one or more first and second legs 42, 44, mounted at the surface of the borehole 14 via one or more surface mounts 46. The embodiment of FIG. 3 may also include one or more fluid analyzers 35 located downhole. By placing the first mirror 48 at a downhole location, the laser beam 15B may be directed at the one or more target locations 24, 34 such that the laser beam 15B is normal to (or perpendicular to) the formation surface, which may allow specific areas to be more easily targeted, as well as potentially intensifying the heating action due to the angle of incidence (that is, the angle at which the laser beam 15B is hitting the formation surface) being normal to the formation surface. In addition, if there are obstructions preventing direct line-of-sight between the one or more laser generators 12 and the one or more target locations 24, 34, or if the target locations 24, 34 are obstructed or blocked from view, the downhole first mirror 48 may be used to provide indirect access to the target locations 24, 34 via reflection off the surface of the first mirror 48. The first mirror 48 may pivot on the first and second mounting poles 40A, 40B such that the angle and/or orientation of the first mirror 48 may be adjusted so as to reflect the one or more laser beams 15B at a given target location 24, 34, as needed.

Figure 4:
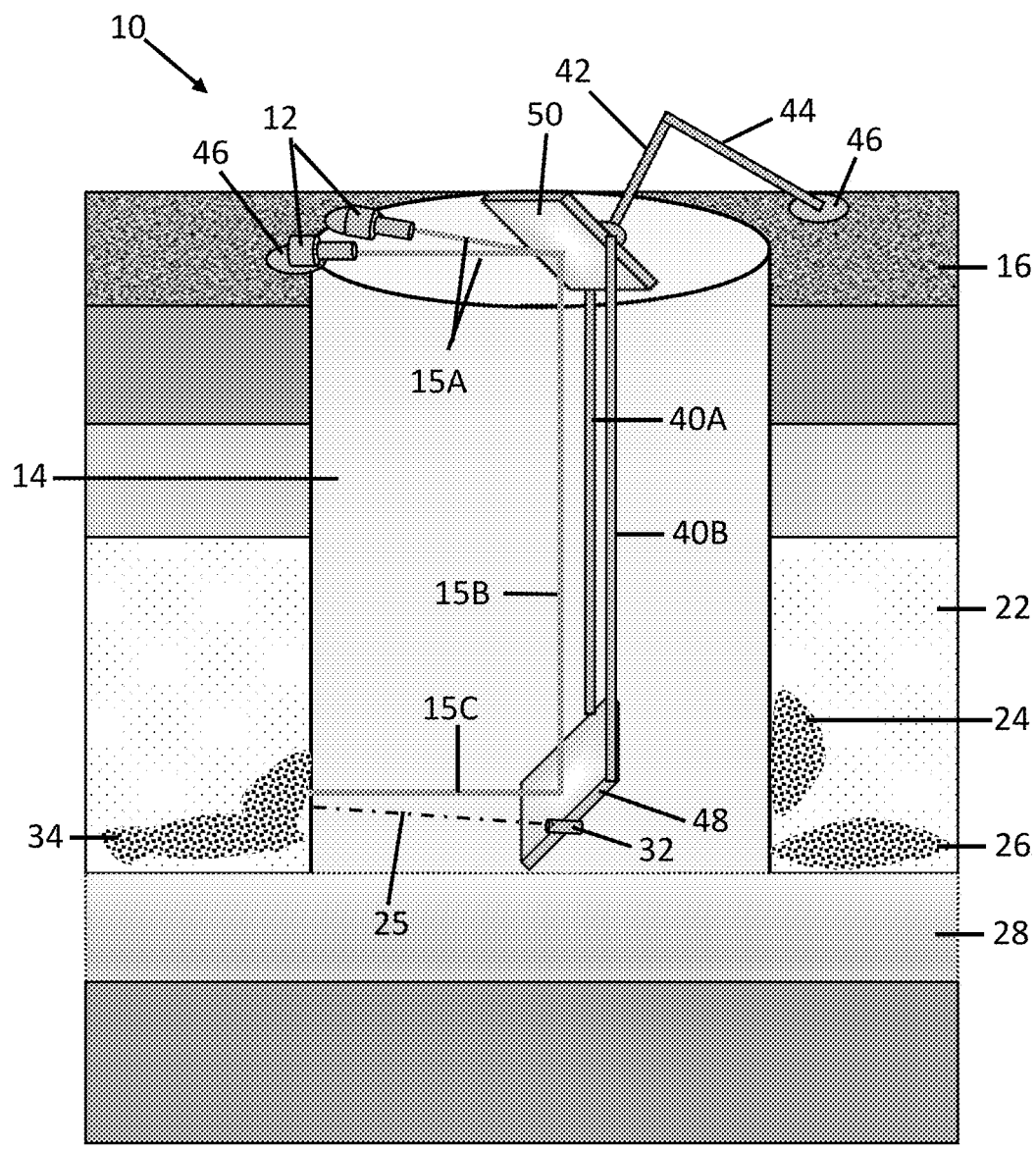
FIG. 4 illustrates a side view of a borehole heating system, according to the present embodiments.

FIG. 4 illustrates an embodiment of the borehole heating system 10, according to aspects of the present disclosure, including the borehole 14, surface soil 16, and the hydrocarbon layer 22, which includes areas of heavy hydrocarbons 26, as well as first and second target locations 24, 34. In the embodiment of FIG. 4, a second mirror 50 may be disposed at the opening of the borehole 14, near the surface. One or more surface laser generators 12 coupled to surface mounts 46 may emit one or more laser beams 15A at the second mirror 50 off of which they may reflect resulting in one or more first reflected beams 15B directed at the first mirror 48 off of which they reflect resulting in one or more second reflected beams 15C directed at the one or more target locations 34. In the embodiment of FIG. 4, the borehole heating system 10 may also include first and second mounting poles 40A, 40B coupled to one or more of the first and second mirrors 48, 50 as well as first and second legs 42 (and surface mounts 46) for moving the location(s) of various components of the system 10. Wirelines, slicklines, coiled tubing, and other mechanisms may also be used to move components around within the borehole 14. In the embodiment of FIG. 4, the borehole heating system 10 may include one or more infrared pyrometers 32 mounted on the first mirror 48 (that is, in a downhole location) such that the infrared pyrometer 32 may be in a direct line of sight with the one or more target location 24, 34. Bringing the one or more infrared pyrometers 32 downhole (and thus closer to the one or more target locations 24, 34) may also result in more accurate temperature readings. Data from the one or more infrared pyrometers 32 may be wirelessly transmitted to one or more surface controllers and/or electronic devices (not shown) to which it is communicatively coupled.

Each of the first and second mirrors 48, 50 illustrated in FIGS. 3 and 4 may include various types of mirrors to enhance reflectivity. For example, each of the first and second mirrors 48, 50 may include one or more: plasma mirrors, supermirrors, Bragg mirrors, ultra-high reflectivity mirrors, dielectric mirrors, dispersive mirrors, dichroic mirrors, and other suitable types of reflecting surfaces. Each of the first and second mirrors 48, 50 illustrated in FIGS. 3 and 4 may also be shaped such that they magnify the incoming laser beams 15, 15A, 15B. For example, each of the first and second mirrors 48, 50 may include reflecting surfaces that include a parabolic, hyperbolic, circulars, elliptical, or other suitable shapes for reflecting the laser beams 15, 15A, 15B. In high laser-power applications, each of the first and second mirrors 48, 50 may include a temperature resistant metallic or dielectric reflecting surface capable of withstanding the high temperatures resulting from high laser-power operations. Each of the first and second mirrors 48, 50 may also include aluminum, copper, gold, silver, or other metallic coatings to help mitigate the heat resulting from high laser-power operations. In one or more high laser-power embodiments, it may not be possible to employ the first and second mirrors 48, 50 due to the heat generated by the laser generators 12, as well as due to the operational conditions present in the downhole environment. In addition, each laser generator 12 of the array of laser generators 12 may be positioned and oriented such that the respective reflected laser beam 15B, 15C is directed precisely at (or near) the one or more target locations 24, 34. The borehole heating system 10 may also include one or more lenses (not shown) for magnifying the intensity of the one or more laser beams 15. Referring to FIGS. 3 and 4, the borehole heating system 10 may include mirrors only at the surface of the borehole 14, only within the borehole 14, or at both the surface of the borehole 14, as well as within the borehole 14.

In operation, the required energy to mobilize heavy hydrocarbons depends on several factors including (but not limited to): 1) the chemical kinetics of breaking down the heavy hydrocarbon molecules, which can be modeled in the lab through pyrolysis tests at the same heating rate of the lasers (that is, the rate of heat addition at the formation due to each laser), 2) the amount of hydrocarbon molecules being targeted, (that is, the total area of the one or more target locations), and 3) the subsurface temperature conditions of the targeted hydrocarbons. The borehole heating system 10 may heat the surface of the formation to temperatures from about 100 degrees C. to about 600 degrees C. In other embodiments, the borehole heating system 10 may heat the surface of the formation to temperatures in a range from about 200 degrees C. to about 550 degrees C. In other embodiments, the borehole heating system 10 may heat the surface of the formation to temperatures in a range from about 300 degrees C. to about 500 degrees C. In other embodiments, the borehole heating system 10 may heat the surface of the formation to temperatures in a range from about 350 degrees C. to about 450 degrees C.

If the formation surface is heated too high, the possibility exists for mobilized gas to ignite. Therefore, the borehole heating system 10 may target surface temperatures in the pyrolysis range (that is, the range at which heavy hydrocarbons 26 may break down and become mobilized), but safely beneath a temperature at which mobilized hydrocarbons may auto-ignite in the presence of oxygen. As such, a formation temperature may initially be heated beyond one or more hydrocarbon auto-ignition temperatures, but as the heat dissipates into the formation (for example, via conduction) and begins to mobilize heavy hydrocarbons therein, the borehole heating system 10 may decrease the heat addition to the system to avoid igniting mobilized hydrocarbons that have seeped from the formation into the borehole 14 (that is, where the mobilized hydrocarbons may be in the presence of oxygen). As a pyrolysis temperature range is being achieved or exceed (based on infrared pyrometer readings of the formation surface temperature) the borehole heating system 10 (or control system thereof) may redirect one or more laser generators 12 of the array of laser generators 12 to other target locations 24, 34. For example, one or more laser generators 12 may be refocused to widen the target locations 24, 34 while simultaneously spreading out the heat addition (and thereby avoiding excessive temperatures in any one area). Several aspects of the borehole heating system 10 including (but not limited to) the operating power of each laser generator 12, the number of laser generators 12 being operated, the targeted locations 24, 34, as well as the use of mirrors 48, 50 and lenses, may all be used to maintain the formation temperature at or near a pyrolysis temperature range. In some cases, the formation surface temperature may exceed the top end of the pyrolysis temperature range so that, as heat dissipates into the formation via conduction (portions of which are lost via heat transfer to the environment in the process) the temperatures within the formation are within a pyrolysis temperature range (about 100 degrees C. to about 600 degrees C.).

The borehole heating system 10 may also employ predetermined energy levels to achieve pyrolysis conditions in the formation (or more generally, to aid in the breaking down and mobilization of heavy hydrocarbons). For example, based on the composition of the formation (for example, sandstone, carbonate, et cetera), as well as the total area or areas of the planned target locations(s), and the depth of the target location(s) 24, 34 (which correlate to the formation temperature), an operating power level of the array of laser generators 12 (or of each individual laser generator 12), may be pre-calculated such that the desired formation temperature range may be achieved without requiring the use of infrared pyrometers 32, or continual monitoring of the formation temperature. As heating of the heavy hydrocarbons 26 occurs in the formation, the pore pressure increases, which may act to increase the flow of mobilized hydrocarbons (and/or other fluids) out of the formation. Therefore, a borehole outlet flow may be monitored to ensure that the increased pore pressure (due to the formation heating) does not cause a maximum borehole effluent flow capacity to be exceeded.

The borehole heating system 10 may target a specific depth zone within the borehole 14, which may include a mixture of water (or other liquids such as drilling fluid, slurry, drill mud, et cetera) and gas occupying the same pore space. The array of laser generators 12 may be used to heat the overall fluid mixture (that is, which may include gases, and liquids including one or more liquids of different viscosities). For example, if liquid water is present in the depth zone being targeted by the array of laser generators 12, the water may vaporize (into steam) and transfer heat to the formation, thereby helping to heat the formation and trapped heavy hydrocarbons 26 within. As liquid water vaporizes or evaporates, the array of laser generators 12 may then target the formation directly (for example, as a water level within the borehole 14 drops), potentially increasing both the rate of heat addition into the formation, as well as the rate of hydrocarbon mobilization.

Each of the laser generators 12 may be calibrated to one or more specific wavelengths for enhancing the transfer of heat into the formation and heavy hydrocarbons 26. For example, each of the laser generators 12 may operate in the gamma ray spectrum, the ultraviolet spectrum, the infrared spectrum, as well as within other spectra. In one embodiment, each of the laser generators 12 may operate at wavelengths from about 100 nm to about 2 mm. In other embodiments, each of the laser generators 12 may operate at wavelengths from about 500 nm to about 1.5 mm. In other embodiments, each of the laser generators 12 may operate at wavelengths from about 800 nm to about 1.0 mm. In other embodiments, each of the laser generators 12 may operate at wavelengths from about 1 micron to about to about 500 microns. In other embodiments, each of the laser generators 12 may operate at wavelengths from about 2 microns to about to about 100 microns. In other embodiments, each of the laser generators 12 may operate at wavelengths from about 3 micron to about to about 50 microns. In other embodiments, each of the laser generators 12 may operate at wavelengths from about 4 micron to about to about 20 microns. Each of the laser generators 12 may also operate at other sub-ranges between about 100 nm and about 2 mm, as well as at other wavelengths above 2 mm and below 100 nm. The array of laser generators 12 may target multiple wavelengths simultaneously. Depending on the composition of the heavy hydrocarbons, certain wavelength ranges may be preferable because of enhanced absorption exhibited by the hydrocarbon. However, even at wavelengths that are not specifically tailored to be absorbed by the heavy hydrocarbons 26, the laser generators 12 may still be effective at heating up the formation and heavy hydrocarbons 26 within.

The present disclosed embodiments may include several benefits over existing solutions. For example, using a surface array of laser generators 12 to heat heavy hydrocarbons 26 within the borehole 14 has the advantage of not having to lower any laser generators 12 into the borehole 14. The present borehole heating system 10 also can very specifically target the one or more target locations 24, 34, thereby increasing the effectiveness of the overall heat transfer into portions of the formation that are likely to produce mobilized hydrocarbons. In addition, the borehole heating system 10 of the present disclosed embodiments utilize only the single borehole 14, and do not require a separate well to be dug to enable the injection of steam and other heating fluids, which is often performed in existing systems, and which incurs additional labor and schedule costs. Stated otherwise, the present disclosed embodiments use a single borehole 14 for both heating and production. The borehole heating system 10 of the present disclosed embodiments may also be easily fine-tuned by adjusting the power to one or more individual laser generators 12, by increasing or reducing the number of laser generators 12 being operated, as well as by orienting the laser generators 12 to one or more target locations 24, 34.

Hydrocarbon Sensors

The present disclosure describes systems and methods for heating up hydrocarbons and monitoring the breakdown of hydrocarbons found in the subsurface of a formation or borehole. The present disclosed embodiments use an array of lasers that are placed on top of (or within) the borehole 14 and target hydrocarbons at specific depths in the subsurface or borehole 14. Heating up the hydrocarbon induces gas seepage. The generated gas can be monitored using hydrocarbon sensors placed downhole. The hydrocarbon sensors (hereinafter "HC sensors") may provide insights on the heating progress, as well as the most permeable sections of the formation.

Figure 5:
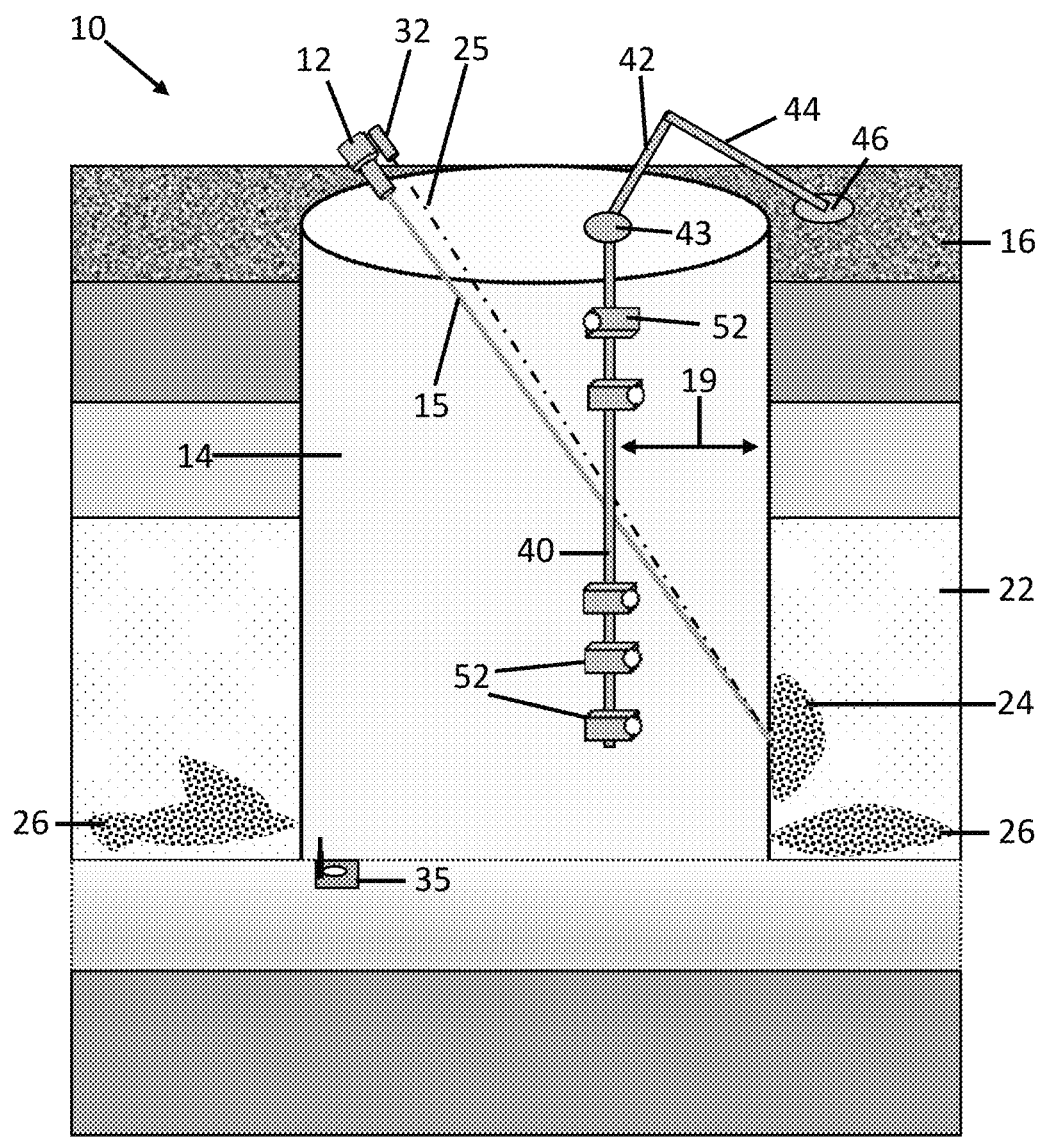
FIG. 5 illustrates a side view of a borehole heating system, according to the present embodiments.

FIG. 5 illustrates an embodiment of the borehole heating system 10, according to aspects of the present disclosure, including the borehole 14, surface soil 16, and the hydrocarbon layer 22, which includes areas of heavy hydrocarbons 26. The borehole heating system may include one or more laser generators 12 disposed at the surface of the borehole 14 emitting a laser beam 15 at one or more target locations 24, as well as one or more infrared pyrometers 32 emitting an infrared beam 25 at the one more target locations 24 for determining at least one formation temperature. In the embodiment of FIG. 5, the borehole system 10 may include one or more hydrocarbon (HC) sensors 52 within the borehole 14 and mounted to a mounting pole 40. The one or more HC sensors 52 may be vertically spaced along the mounting pole 40 such that they are disposed at a range of depths of the borehole 14. The mounting pole 40 may itself be coupled at a hub 43 to one or more first legs 42 which may in turn be coupled to one or more second legs 44 mounted at the borehole surface via one or more surface mounts 46. Wirelines, slicklines, coiled tubing, and other mechanisms may also be used to move components around within the borehole 14. The borehole heating system 10 may also include one or more fluid analyzers 35 located within the borehole 14.

Referring still to FIG. 5, in one embodiment, the one or more HC sensors 52 are disposed at a borehole wall such that they will be proximate where gas is likely to seep from the formation, and subsequently flow vertically toward the surface of the borehole 14. A first distance 19 defines a distance from a centerline of the mounting pole 40 to the nearest borehole wall (or portion thereof). In other embodiments, the first distance 19 may be defined as from the geometric center of one or more HC sensors to the nearest borehole wall (or portion thereof). In one embodiment, the first distance is less than or equal to about 20% of the borehole diameter. In another embodiment, the first distance 19 is less than or equal to about 10% of the borehole diameter. In another embodiment, the first distance 19 is less than or equal to about 5% of the borehole diameter. In another embodiment, the first distance 19 is less than or equal to about 2% of the borehole diameter. In another embodiment, the first distance 19 is less than or equal to about 1% of the borehole diameter. One or more of the HC sensors 52 may be oriented at a different angle than at least one other HC sensor 52.

In operation, as the borehole heating system 10 begins to heat up heavy hydrocarbons 26 in the borehole 14 or in the adjacent formation, the heavy hydrocarbons will begin to breakdown and will generate volatile hydrocarbons (including gas) that can be detected by the one or more hydrocarbons sensors 52 disposed in the borehole 14. As the HC sensors 52 begin to detect hydrocarbon gas seepage, one or more indications may be transmitted to one or more control system components (not shown). The one or more indications may include information about the surface temperature at the target location 24, the time duration for which the laser generators 12 have been heating the target location 24, the location of the target location 24, as well as other information including (but not limited to) the composition of the seepage gas. The information may also include an indication that a pyrolysis temperature of the heavy hydrocarbons 26 within the formation has been reached. The control system may use the information to create or refine models of heavy hydrocarbon pockets or accumulations within the formation in order to establish schedules and control schemes for defining the target locations 24, 34 and the target times to which the one or more laser generators 12 should be directed. The spacing between HC sensors 52 as well as the number of HC sensors 52 may vary from one application to the next. For example, in one embodiment, the borehole heating system 10 may include from about ten (10) to about twenty (20) HC sensors 52 evenly vertically distributed through the entire depth of the borehole 14. In another embodiment, the borehole heating system 10 may include from about one (1) to about twelve (12) HC sensors 52 concentrated proximate the hydrocarbon layer 22 of the borehole 14. In another embodiment, the borehole heating system 10 may include from about three (3) to about fifteen (15) HC sensors, including from about one (1) to about ten (10) HC sensors 52 concentrated proximate the hydrocarbon layer 22, and including from about one (1) to about ten (10) HC sensors 52 disposed above the hydrocarbon layer 22.

Still referring to FIG. 5, in some embodiments, the locations of the hydrocarbon sensors 52 may be adjusted so that regions of the formation that include increased seepage may be emphasized, thereby resulting in an overall system that is calibrated to concentrate on the most active areas. For example, monitoring the hydrocarbon presence at various depths of the borehole 14 not only allows the borehole heating system 10 to detect induced gas seepage, but it also enables a permeability profile of the formation to be determined, which in turn can be used to treat accumulated tar pads that may clog formation pores. In addition, by using an array of HC sensors 52 to detect the presence of hydrocarbon seepage within the borehole 14, the control system of the borehole heating system 10 may increase, decrease, or maintain the total power of the one or more laser generators 12 power, and may also be used to adjust the boundary area of the target location(s) 24. For example, if after heating a target location 24 for a period of time the HC sensors 24 begin to detect the presence of hydrocarbon gas seepage (or increased seepage), the control system may direct the input power to the one or more laser generators 12 to be reduced (or alternatively, the control system may direct one or more laser generators 12 to be taken out of service). In other embodiments, after heating a target location 24 for a period of time, the HC sensors 24 begin to detect the presence of hydrocarbon gas seepage, the control system may direct one or more laser generators 12 to target a different area (for example, an adjacent area, or an entirely different area).

Figure 6:
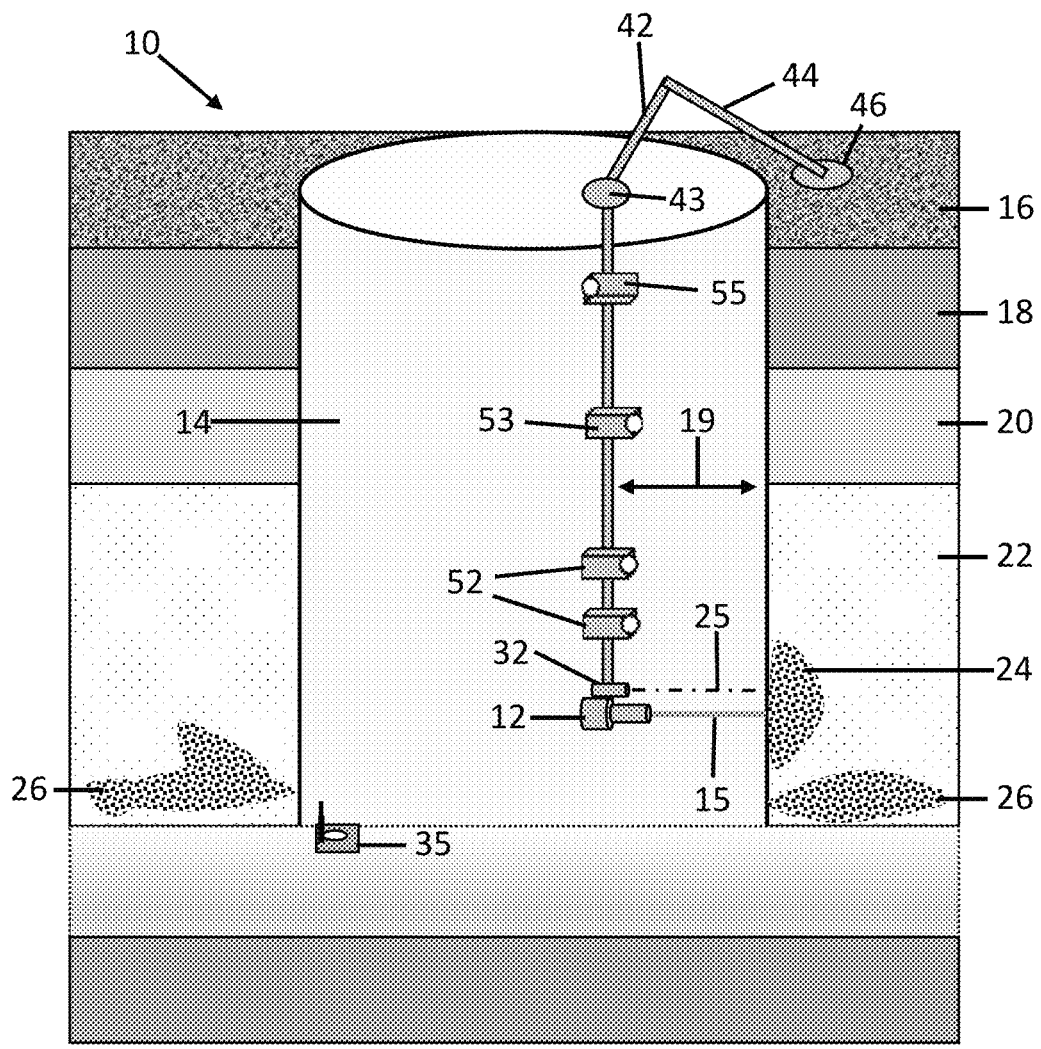
FIG. 6 illustrates a side view of a borehole heating system, according to the present embodiments.

FIG. 6 illustrates an embodiment of the borehole heating system 10, according to aspects of the present disclosure, including the borehole 14, surface soil 16, and the hydrocarbon layer 22, which includes areas of heavy hydrocarbons 26. The borehole heating system may include one or more laser generators 12 as well as one more infrared pyrometers 32 mounted to the mounting pole 40, along with one or more HC sensors 52. The one or more laser generators 12 disposed in the borehole 14 emit one or more laser beams 15 at the target location(s) 24 (and the infrared pyrometer(s) 32 emit an infrared beam 25 at the one or more target locations 24 for determining at least one formation temperature. The borehole heating system 10 may also include at least one hub 43 coupled to the mounting pole 40, at least one first leg 42 coupled to the hub 43, at least one second leg 44 coupled to the at least one first leg 42, at least one surface mount 46 coupled to the at least one second leg 44 and the surface of the borehole 14, as well as at least one fluid analyzer 35 disposed in the borehole 14. Wirelines, slicklines, coiled tubing, and other mechanisms may also be used to move components around within the borehole 14. In the embodiment of FIG. 6, the borehole system 10 may include one or more HC sensors 52 disposed at depths corresponding to the hydrocarbon layer, as well as at least one first HC sensor 53 disposed at a depth corresponding to the cap rock layer 18, as well as at least one second HC sensor 55 disposed at a depth corresponding to the gas layer 20. Gas seepage from the hydrocarbon layer 22 into both the gas layer 20 and the cap rock layer 18 may be detected by the at least one first and second HC sensors 53, 55 disposed at the respective formation layers 18, 20. As the distance from the source of the gas seepage (for example, the hydrocarbon layer 22) increases, the concentration (and thus the detectability) of the gas seepage may decrease.

Figure 7:
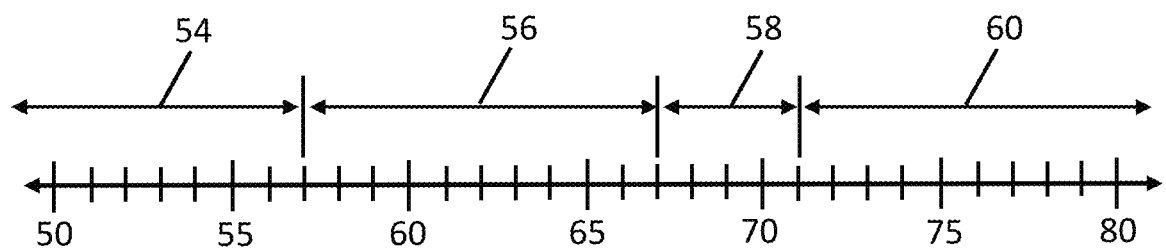
FIG. 7 illustrates a schematic of a composition index, according to the present embodiments.

FIG. 7 illustrates a schematic of an ethane composition index 70 that may be used in connection with aspects of the present embodiments. The ethane composition index 70 includes numerical values at the bottom of FIG. 7 representing the ethane composition index, which is the ratio of methane to ethane, propane, and other hydrocarbons. For example, at an ethane composition index of 50, there is 50 times as much methane as ethane, propane and other hydrocarbons in a given sample. As the ethane composition index rises in value, the lighter or less viscous the sample, due to higher amounts of ethane. As the ethane composition index decreases in value, the heavier or more viscous the sample, due to higher amounts of heavier hydrocarbons. HC sensors 52, 53, 55 may be used to determine the ethane composition index.

Referring still to FIG. 7, a first region 54 is illustrated in FIG. 7 including ethane composition index values up to and including about 57 (for example from about zero (0) to about fifty-seven (57). The ethane composition index values in the first region 54 correspond to heavy hydrocarbon sources. Stated otherwise, if gas seepage includes ethane composition index values of 57 or below, the source of the gas seepage is likely from heavy hydrocarbons. A second region 56 includes ethane composition index values from about 57 to about 67. The ethane composition index values in the second region 56 correspond to light crude oil (that is lighter hydrocarbon) sources. A third region 58 includes ethane composition index values from about 67 to about 71. The ethane composition index values in the third region 58 correspond to hydrocarbon condensate sources. A fourth region 60 includes ethane composition index values of about 71 and higher. The ethane composition index values in the fourth region 60 correspond to hydrocarbon gas sources. By determining the ethane composition index value for gas seepage at particular regions within a borehole (that is, using hydrocarbon sensors 52, 53, 55), insights can be gained into the source of the hydrocarbon gas seepage, which in turn can help determine if heating of the borehole 14 in a particular region should be performed via one or more laser generators 12. For example, in one embodiment, one or more hydrocarbon sensors 52, 53, 55 may be disposed at a particular depth within a borehole 14 (for example, a depth corresponding to a hydrocarbon layer 22, a gas layer 20, or a cap rock layer 18), and may determine that the ethane composition index has a value of 50, which will imply that the source of the gas seepage at that location is from heavy hydrocarbons 26, which may suggest that heating of the borehole 14 in that location may be beneficial. In another example, the one or more hydrocarbon sensors 52, 53, 55 may be disposed at a different location within the borehole 14, and may determine that the ethane composition index has a value of 80, implying that the source of the gas seepage is a gas layer, and that no heating is required.

Figure 8:
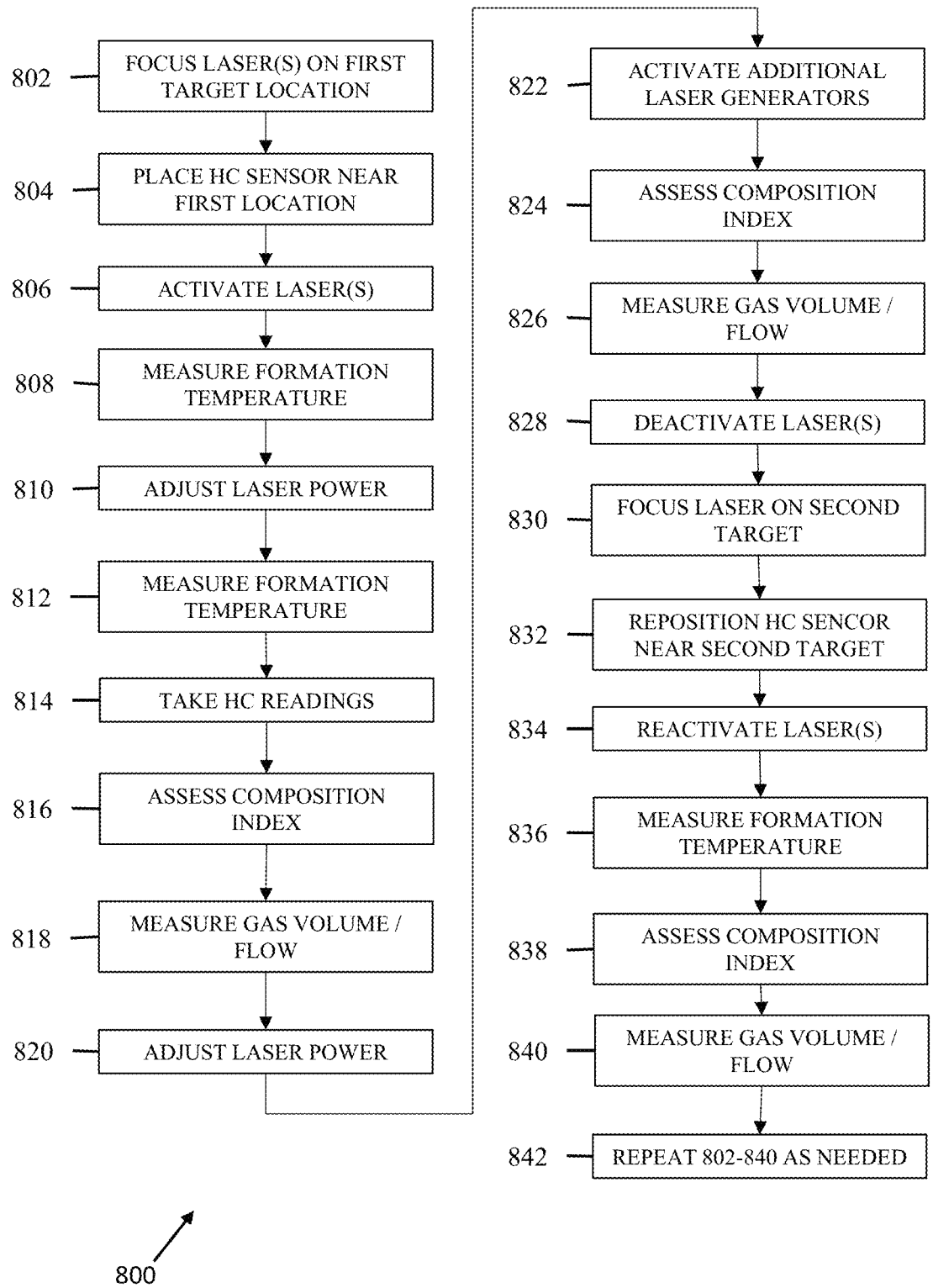
FIG. 8 illustrates a flow chart representation of a method of heating a borehole, in accordance with aspects of the present disclosed embodiments.

FIG. 8 illustrates a method 800 of heating a borehole 14, according to aspects of the present embodiments. At step 802, the method 800 may include focusing one or more laser generators 12 or laser beams 15 on a first target location 24. Prior to step 802, the method 800 may include identifying a first target location using readings from one or more HC sensors 52, 53, 55 or from a fluid analyzer 35. At step 804, the method 800 may include placing at least one HC sensor 52, 53, 55 near the first target location 24. At step 806, the method 800 may include activating at least one laser generator 12. At step 808, the method 800 may include measuring a formation temperature or a surface temperature at or near the first target location 24 using one or more infrared pyrometers 32, or other suitable temperature gauges. At step 810, the method 800 may include adjusting a power of at least one laser generator 12 based on a reading from the infrared pyrometer 32 (for example, raising a power level to increase the target location temperature, or decreasing a power level to maintain or decrease a temperature of the first target location 24). This step may also include adjusting a frequency of the laser generator 12 to target an enhanced or optimized activation frequency of heavy hydrocarbons 26 at the first target location 24. At step 812, the method 800 may include re-measuring the formation temperature (using the infrared pyrometers 32 or other temperature probes) in order to determine if an approximate hydrocarbon pyrolysis temperature within the formation has been achieved. At step 814, the method 800 may include taking one or more hydrocarbon sensor 52, 53, 55 readings within the borehole 14 to determine the volume or composition (or both) of gas seepage within the borehole 14.

Referring still to FIG. 8, at step 816, the method 800 may include assessing the ethane composition index of gas seepage within the borehole (for example, using the HC sensors 52, 53, 55) to determine the source of the gas seepage. At step 818, the method 800 may include measuring the volume of the gas seepage within the borehole 14. Measuring the volume of gas seepage within the borehole 14 may be performed at step 818, at step 814, or at both steps 814 and 818. At step 820, the method 800 may include adjusting a power, a frequency, or both a power and frequency of at least one laser generator 12. Stated otherwise, at step 820, the method 800 may include adjusting at least one operational parameter of the at least one laser generator 12. At step 822, the method 800 may include activating additional laser generators 12 (for example, in order to increase the temperature of the formation at the target location 24 or to increase the area of the first target location 24 such that heating occurs across a wider area). At step 824, the method 800 may include reassessing the ethane composition index to understand if the source of the gas seepage within the borehole 14 has changed (for example, if the ethane composition index has dropped, it implies that more of the gas seepage is derived from a heavy hydrocarbon source (that is, when compared to the original ethane composition index assessment), as a result of heavy hydrocarbons heating up and becoming mobilized due to the laser heating). At step 826, the method 800 may include measuring the volume of gas seepage within the borehole 14 (for example, to understand how long a particular target location 24, 34 should be heated before moving on to another target location). At step 828, the method 800 may include deactivating the one or more laser generators 12.

Still referring to FIG. 8, at step 830, the method 800 may include focusing the one or more laser generators 12 on a second target location 34. At step 832, the method 800 may include repositioning one or more HC sensors 52, 53, 55 at or near the second target location 34. At step 834, the method 800 may include reactivating the one or more laser generators 12. At step 836, the method 800 may include measuring a formation temperature (for example, using the infrared pyrometer(s) 32) at the second target location 34. At step 838, the method 800 may include taking readings from the HC sensors 52, 53, 55 and assessing the ethane composition index based on the HC sensor readings. At step 840, the method 800 may include measuring a volume flow rate of the gas seepage within the borehole 14 (for example, to understand how long the second target location 34 should be heated before moving on to another target location). At step 842, the method 800 may include repeating any of steps 802-840 as many times as needed. According to aspects of the present embodiments, method 800 may also include steps not illustrated in FIG. 8. In addition, one or more steps illustrated in FIG. 8 may be omitted. One or more steps illustrated in FIG. 8 may also be performed concurrently with other steps, or in a different order than what is illustrated in FIG. 8.

According to aspects of the present disclosed embodiments, the borehole heating system 10 including one or more HC sensors 52, 53, 55 may be used to monitor the gas seepage within the borehole 14 over time. By placing several HC sensors 52, 53, 55 at different depths within the borehole 14, information can be gathered for interpreting and analyzing the petroleum systems within a formation. For example, how well a formation is sealed (or how porous it is), the heaviest flow regions of a borehole 14 or formation, how different portions of a formation response to borehole heating, the geometry and layout of hydrocarbon migration pathways, as well as how such hydrocarbon migration pathways change over time, are all points of information that can be gathered via gas seepage monitoring using HC sensors 52, 53, 55. This information can then be translated into enhanced well production and operation due to focusing an enhanced number of laser generators 12 on the enhanced target locations, at the enhanced power levels and frequencies, and for the enhanced time durations. As long as regions of the borehole 14 where oxygen is present are maintained below the hydrocarbon auto-ignition temperature, heating of the formation via the borehole heating system 10 of the present embodiments will likely aid well production due to: 1) heating of water which will vaporize and heat up borehole walls as it exits the well (thereby heating those portions of the formation) as it rises out of the borehole, 2) direct formation heating via the one or more laser generators 12, and 3) de-clogging or removal of tar pads and tar matts, thereby mobilizing heavy hydrocarbons as well as freeing up lighter hydrocarbons, condensates and gases that may be trapped underneath. The systems and components of the present disclosed embodiments may be used both for the discovery as well as the recovery of hydrocarbons and heavy hydrocarbons (HCC) (for example, in connection with the laser heating of formations).

The embodiments disclosed herein may include multiple laser generators 12, infrared pyrometers 32, fluid analyzers 35, HC sensors 52, 53, 55, reflecting mirrors 48, 50, and associated mounting, power, and communication equipment disposed at the surface of the borehole 14, within the borehole 14, as well as combinations thereof. The other temperature measuring devices including (but not limited to) RTDs, thermocouples, thermistors, and thermometers may be used in place of or in addition to the one or more infrared pyrometers 32. Spectrographic infrared cameras may be used in place of or in addition to the one or more HC sensors 52, 53, 55. Each of the laser generators 52 may accommodate power levels as high as 5-10 kW. In some embodiments, the array of laser generators 52 may include one or more laser generators 52 with different power levels to allow for fine tuning of the total power of the array of laser generators 52. In some embodiments, each laser generator 52 may include mechanisms allowing the laser to be focused on a broader or narrower area, thereby allowing the laser intensity to be adjusted. As such, high power lasers may be used over a broader area in order to minimize the risk of overheating the formation. One or more HC sensors 52, 53, 55 may also be embedded in the formation, soil, or within pores, passageways or other cavities within the formation, in order to detect seepage and even micro-seepages (for example, trace amounts) of hydrocarbons, which may provide insights into changes that may occur within the formation over time. The borehole heating system 10 may also include one or more gas flow meters disposed at the surface of the borehole 14, or at other gas effluent locations, in order to determine the volume of gas flowing out of the borehole 14. These additional gas flow meters may be used to determine gas flow instead of the one or more HC sensors 52, 53, 55, or in addition to the one or more HC sensors 52, 53, 55.

Each of the instruments, devices, and sensors described in the present disclosure may include a wired power supply or a wireless power supply such as a battery, capacitor, or other suitable mechanism. Each of the instruments, devices, and sensors described in the present disclosure may be communicatively coupled (via wireless communication or other mechanisms such as radio, Ethernet cable, phone line, et cetera) to a surface control system or electronic device for receiving inputs from each of the instruments, devices, and sensors and also for transmitting one or more signals to each of the instruments, devices, and sensors. Wirelines may be used both to physically support and move each of the instruments, devices, and sensors described in the present disclosure, and also to communication with each of the instruments, devices, and sensors described in the present disclosure. Each of the instruments, devices, and sensors described in the present disclosure may be controlled automatically via one or more control systems or may be controlled manually via on-site (or remotely-located) personnel.

All or part of the system and processes described in this specification and their various modifications (subsequently referred to as "the processes") may be controlled at least in part by one or more computing systems using one or more computer programs. Examples of computing systems include, either alone or in combination, one or more desktop computers, laptop computers, servers, server farms, and mobile computing devices such as smartphones, feature phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, CD-ROMs (compact disk-read only memory) and DVD (digital versatile disk) ROM.

Each computing device may include a hard drive for storing data and computer programs, one or more processing devices (for example, a microprocessor), and memory (for example, RAM) for executing computer programs. Each computing device may include an image capture device, such as a still camera or video camera. The image capture device may be built-in or simply accessible to the computing device.

Each computing device may include a graphics system, including a display screen. A display screen, such as a liquid crystal display (LCD) or a CRT (Cathode Ray Tube) displays to a user images that are generated by the graphics system of the computing device. One or more displays or images on a computer display (for example, a monitor) physically transforms the computer display. For example, if the computer display is LCD-based, the orientation of liquid crystals may be changed by the application of biasing voltages in a physical transformation that is visually apparent to the user. As another example, if the computer display is a CRT, the state of a fluorescent screen may be changed by the impact of electrons in a physical transformation that is also visually apparent. Each display screen may be touch sensitive, allowing a user to enter information onto the display screen via a virtual keyboard. On some computing devices, such as a desktop computer or a smartphone, a physical QWERTY keyboard and Arabic keyboard and scroll wheel may be provided for entering information onto the display screen.

Each computing device, and computer programs executed on each computing device, may also be configured to accept voice commands, and may be configured to perform functions in response to such commands. For example, the process described in this specification may be initiated at a client, to the extent possible, via voice commands.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

CERTAIN DEFINITIONS

In order for the present disclosure to be more readily understood, certain terms are first defined below. Additional definitions for the following terms and other terms are set forth throughout the specification.

An apparatus, composition, or method described herein as "comprising" one or more named elements or steps is open-ended, meaning that the named elements or steps are essential, but other elements or steps may be added within the scope of the composition or method. To avoid prolixity, it is also understood that any apparatus, composition, or method described as "comprising" (or which "comprises") one or more named elements or steps also describes the corresponding, more limited composition or method "consisting essentially of" (or which "consists essentially of") the same named elements or steps, meaning that the composition or method includes the named essential elements or steps and may also include additional elements or steps that do not materially affect the basic and novel characteristic(s) of the composition or method. It is also understood that any apparatus, composition, or method described herein as "comprising" or "consisting essentially of" one or more named elements or steps also describes the corresponding, more limited, and closed-ended composition or method "consisting of" (or "consists of") the named elements or steps to the exclusion of any other unnamed element or step. In any composition or method disclosed herein, known or disclosed equivalents of any named essential element or step may be substituted for that element or step.

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring gas seepage in a borehole, the system comprising:
    multiple hydrocarbon sensors disposed within the borehole; and
    at least one laser generator disposed proximate the borehole for heating at least one target location within the borehole,
    where gas seepage from the heating of the at least one target location is detected by the multiple hydrocarbon sensors, and
    where at least one hydrocarbon sensor of the multiple hydrocarbon sensors is oriented at a different angle than at least one other hydrocarbon sensor of the multiple hydrocarbon sensors.

2. The system of claim 1, where the at least one laser generator is disposed at a location that comprises at least one of:
    the borehole surface; and
    within the borehole.

3. The system of claim 1, where the multiple hydrocarbon sensors are vertically arranged at multiple depths within the borehole.

4. The system of claim 3, further comprising:
    at least one mounting arm aligned vertically and disposed within the borehole; and
    at least one infrared pyrometer mounted to the at least one mounting arm,
    where the multiple hydrocarbon sensors are mounted to the at least one mounting arm, and
    where the at least one laser generator is mounted to the at least one mounting arm.

5. The system of claim 4, where a centerline of the at least one mounting arm is disposed at a first distance from a borehole wall, and
    where the first distance is from one (1) percent to ten (10) percent of a borehole diameter.

6. The system of claim 1, further comprising at least one hydrocarbon sensor of the multiple hydrocarbon sensors disposed at a depth within the borehole corresponding to a hydrocarbon layer of a formation in which the borehole is disposed.

7. The system of claim 1, further comprising at least one hydrocarbon sensor of the multiple hydrocarbon sensors disposed at a depth within the borehole corresponding to a gas layer of a formation in which the borehole is disposed.

8. The system of claim 1, further comprising at least one hydrocarbon sensor of the multiple hydrocarbon sensors disposed at a depth within the borehole corresponding to a cap rock layer of a formation in which the borehole is disposed.

9. The system of claim 1, further comprising:
    at least one mounting arm aligned vertically and disposed within the borehole, a centerline of the at least one mounting arm disposed at a first distance from a borehole wall,
    where the first distance is from one (1) percent to twenty (20) percent of a borehole diameter, and
    where the multiple hydrocarbon sensors are mounted to the at least one mounting arm.

10. The system of claim 1, where the multiple hydrocarbon sensors determine that a source of the gas seepage in the borehole comprises heavy hydrocarbons based on an ethane composition index value of from zero (0) to 57.

11. The system of claim 1, where the multiple hydrocarbon sensors determine that a source of the gas seepage in the borehole comprises light hydrocarbons based on an ethane composition index value from 57 to 67.

12. The system of claim 1, further comprising at least one computing system communicatively coupled to the multiple hydrocarbon sensors, where the at least one computing system determines that a source of the gas seepage in the borehole comprises hydrocarbon condensate based on an ethane composition index value from 67 to 71.

13. The system of claim 1, further comprising at least one control system communicatively coupled to the multiple hydrocarbon sensors, where the at least one control system determines that a source of the gas seepage in the borehole comprises gas based on an ethane composition index value of 71 to 100.

14. A method of monitoring gas seepage within a borehole, the method comprising:
    disposing at least one hydrocarbon sensor within a borehole proximate at least one target location;
    heating the at least one target location via at least one laser generator;
    detecting, at the at least one hydrocarbon sensor, gas seepage within the borehole; and
    adjusting a frequency of the at least one laser generator to target an enhanced activation frequency of heavy hydrocarbons at the target location,
    where the at least one hydrocarbon sensor detects at least one of:
        a gas seepage composition; and
        a volume flow of the gas seepage.

15. The method of claim 14, further comprising:
    determining an ethane composition index value based on at least one reading from the at least one hydrocarbon sensor; and
    determining if a source of the gas seepage within the borehole is from heavy hydrocarbons, light hydrocarbons, hydrocarbon condensate, or gas based on the ethane composition index value.

16. The method of claim 14, further comprising disposing one or more spectrographic infrared cameras within a borehole proximate both the at least one target location and the at least one hydrocarbon sensor,
    where heating the at least one target location comprises heating the target location with at least one laser generator, and
    where at least one operational parameter of the at least one laser generator is adjusted based on at least one reading from at least one of the one or more spectrographic infrared cameras and the at least one hydrocarbon sensor.

17. The method of claim 14, further comprising:
    determining, based on the ethane composition index having a value in a range from 71 to 100, that the source of the gas seepage is a gas layer, and that no further heating is required.

18. A system for monitoring gas seepage in a borehole disposed within a hydrocarbon formation comprising at least one hydrocarbon layer, the system comprising:
    multiple hydrocarbon sensors disposed within the borehole, the multiple hydrocarbon sensors detecting the gas seepage within the borehole, the multiple hydrocarbon sensors comprising from three (3) to fifteen (15) hydrocarbon sensors comprising:

from one (1) to ten (10) hydrocarbon sensors concentrated proximate the at least one hydrocarbon layer; and from one (1) to ten (10) hydrocarbon sensors disposed above the at least one hydrocarbon layer, where at least two (2) hydrocarbon sensors are either concentrated proximate the at least one hydrocarbon layer, or disposed above the at least one hydrocarbon layer, or both concentrated proximate the at least one hydrocarbon layer and disposed above the at least one hydrocarbon layer, where an ethane composition index value is determined based on at least one reading from the multiple hydrocarbon sensors, and where if a source of the gas seepage is from heavy hydrocarbons, light hydrocarbons, hydrocarbon condensate, or gas is determined based on the ethane composition index value.

19. The system of claim 18, further comprising at least one heating source, where the at least one heating source heats at least one portion of the hydrocarbon formation, thereby resulting in the gas seepage within the borehole, and where at least one hydrocarbon sensor of the multiple hydrocarbon sensors is embedded in at least one of a pore, a passageway, and another cavity within the hydrocarbon formation, in order to detect the gas seepage.

20. The system of claim 18, further comprising at least one of a wireline, a slickline, and coiled tubing coupled to the multiple hydrocarbon sensors; and one or more gas flow meters disposed at the surface of the borehole in order to determine a volume of gas flowing out of the borehole.

21. The system of claim 18, further comprising:

a mounting pole, where one or more hydrocarbon sensors of the multiple hydrocarbon sensors are mounted to the mounting pole, the mounting pole comprising one or more mechanisms for translating up and down within the borehole;

a hub coupled to the mounting pole;

one or more first legs coupled to the hub; and one or more second legs coupled to the one or more first legs, where the one or more second legs are mounted at a borehole surface via one or more surface mounts.

* * * * *